United States Patent
Johnson et al.

(10) Patent No.: US 12,359,621 B2
(45) Date of Patent: Jul. 15, 2025

(54) THERMAL MANAGEMENT SYSTEM FOR A GAS TURBINE ENGINE

(71) Applicant: General Electric Company, Schenectady, NY (US)

(72) Inventors: Steven Douglas Johnson, Milford, OH (US); Jonathan Russell Ratzlaff, Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/462,587

(22) Filed: Sep. 7, 2023

(65) Prior Publication Data

US 2023/0417188 A1 Dec. 28, 2023

Related U.S. Application Data

(62) Division of application No. 17/098,998, filed on Nov. 16, 2020, now Pat. No. 11,788,469.

(51) Int. Cl.
*F02C 7/18* (2006.01)
*F02C 7/14* (2006.01)

(52) U.S. Cl.
CPC .............. *F02C 7/18* (2013.01); *F02C 7/14* (2013.01); *F05D 2260/213* (2013.01)

(58) Field of Classification Search
CPC ..... F02C 7/18; F02C 7/047; B64D 2033/0233
See application file for complete search history.

(56) References Cited

U.S. PATENT DOCUMENTS

| | | | |
|---|---|---|---|
| 4,254,618 A | 3/1981 | Elovic | |
| 4,738,416 A | 4/1988 | Birbragher | |
| 5,133,194 A | 7/1992 | Army, Jr. et al. | |
| 5,683,062 A * | 11/1997 | Spiro | B64D 33/02 60/39.092 |
| 7,131,612 B2 * | 11/2006 | Baptist | B64D 15/06 244/134 B |
| 7,246,482 B2 | 7/2007 | Mahoney et al. | |
| 7,398,641 B2 | 7/2008 | Stretton et al. | |
| 8,721,271 B2 | 5/2014 | Wang et al. | |
| 9,200,570 B2 | 12/2015 | Alecu | |
| 9,714,610 B2 | 7/2017 | Snape et al. | |
| 9,903,274 B2 | 2/2018 | Diaz et al. | |
| 10,066,550 B2 | 9/2018 | Riehle et al. | |

(Continued)

*Primary Examiner* — Lorne E Meade
*Assistant Examiner* — Alyson Joan Harrington
(74) *Attorney, Agent, or Firm* — Dority & Manning, P.A.

(57) ABSTRACT

A thermal management system for a gas turbine engine includes a heat exchanger including first and second sides, with the first side in contact with flow path air flowing through a flow path of the engine. Furthermore, the system includes a housing positioned relative to the heat exchanger such that the housing and the second side of the heat exchanger define a plenum configured to receive bleed air from the engine. Moreover, the system includes and at least one of a plurality of fins extending outward from the second side of the heat exchanger in a radial direction into the plenum and along the second surface of the heat exchanger in the circumferential direction or an impingement plate defining a plurality of impingement apertures, with each impingement aperture configured to direct an impingement jet of the bleed air within the plenum onto the second side of the heat exchanger.

14 Claims, 8 Drawing Sheets

(56) References Cited

U.S. PATENT DOCUMENTS

| | | |
|---|---|---|
| 10,125,684 B2 | 11/2018 | Yu |
| 10,364,750 B2 | 7/2019 | Rambo |
| 10,989,411 B2 | 4/2021 | Sampath et al. |
| 11,022,037 B2 | 6/2021 | Niergarth et al. |
| 2009/0165995 A1 | 7/2009 | Bajusz et al. |
| 2010/0163678 A1 | 7/2010 | Gregory et al. |
| 2012/0114467 A1 | 5/2012 | Elder |
| 2013/0219854 A1 | 8/2013 | Alecu |
| 2015/0291284 A1 | 10/2015 | Victor et al. |
| 2015/0377132 A1* | 12/2015 | Caruel .................. F01D 25/12 415/116 |
| 2016/0369697 A1 | 12/2016 | Schwarz et al. |
| 2017/0016347 A1 | 1/2017 | Cortequisse |
| 2017/0089264 A1 | 3/2017 | Jones et al. |
| 2017/0198723 A1 | 7/2017 | Hsu |
| 2017/0328280 A1 | 11/2017 | Hussain et al. |
| 2018/0328285 A1 | 11/2018 | Tajiri et al. |
| 2020/0025072 A1 | 1/2020 | Mackin et al. |

\* cited by examiner

THERMAL MANAGEMENT SYSTEM FOR A GAS TURBINE ENGINE

CROSS REFERENCE TO RELATED APPLICATIONS

This application is a divisional of and claims the right of priority to U.S. patent application Ser. No. 17/098,998, filed Nov. 16, 2020, the disclosure of which is hereby incorporated by reference herein in its entirety for all purposes.

FIELD

The present disclosure generally pertains to gas turbine engines, and, more specifically, to a thermal management system for a gas turbine engine.

BACKGROUND

A gas turbine engine generally includes a compressor section, a combustion section, and a turbine section. During operation, the compressor section progressively increases the pressure of air entering the engine and supplies this compressed air to the combustion section. The compressed air and a fuel mix within the combustion section and burn within a combustion chamber to generate high-pressure and high-temperature combustion gases. The combustion gases flow through a hot gas path defined by the turbine section before exiting the engine. In this respect, the turbine section converts energy from the combustion gases into rotational energy. The extracted rotational energy is, in turn, used to rotate one or more shafts, thereby driving the compressor section and/or a fan assembly of the gas turbine engine. Each shaft is rotatably supported within the gas turbine engine via one or more bearings housing within one or more sumps. In this respect, during operation of the engine, oil is supplied to the sump(s) to lubricate the bearing(s).

Typically, gas turbine engines include a thermal management system for cooling the oil used to lubricate the bearing(s). For example, in some configurations, the thermal management system includes a surface air-cooled oil cooler. In general, such an oil cooler is installed within the engine such that one side of the cooler is in contact with air flowing through a flow passage of the engine. During operation, oil is pumped through the cooler and cooled by the air flowing through the flow passage. To improve heat transfer between the oil and the air, the oil cooler may include fins extending into the flow passage. However, if the fins are too large, the air flow through the flow passage may be negatively affected (e.g., the boundary flow layer may separate, and the total pressure losses may exceed desirable limits). Thus, the cooling capacity of the oil cooler is limited by the maximum size (e.g., the axial length and/or the radial height) of its fins.

Accordingly, an improved thermal management system for a gas turbine engine would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a thermal management system for a gas turbine engine having axial centerline and defining a radial direction extending orthogonal to the axial centerline and a circumferential direction extending concentrically around the axial centerline. The thermal management system includes a heat exchanger including a first side and an opposing, second side, the first side of the heat exchanger in contact with flow path air flowing through a flow path of the gas turbine engine. Furthermore, the thermal management system includes a housing positioned relative to the heat exchanger such that the housing and the second side of the heat exchanger define a plenum configured to receive bleed air from the gas turbine engine. Moreover, the thermal management system includes and at least one of a plurality of fins extending outward from the second side of the heat exchanger in the radial direction into the plenum and along the second surface of the heat exchanger in the circumferential direction or an impingement plate defining a plurality of impingement apertures, with each impingement aperture configured to direct an impingement jet of the bleed air within the plenum onto the second side of the heat exchanger.

In another aspect, the present subject matter is directed to a thermal management system for a gas turbine engine having axial centerline and defining a radial direction extending orthogonal to the axial centerline. The thermal management system includes a gas turbine engine wall at least partially defining a flow path through which flow path air flows, with the gas turbine engine wall further defining a cavity fluidly coupled to the flow path and positioned inward or outward of the flow passage in the radial direction. Additionally, the thermal management system includes a heat exchanger including a first side and an opposing, second side, the heat exchanger positioned within the cavity such that the first side of the heat exchanger is in contact with the flow path air. Moreover, the second side of the heat exchanger and gas turbine engine wall defines a cooling passage therebetween and the cooling passage extends from the flow path at a forward end of the heat exchanger to the flow path at an aft end of the heat exchanger. In addition, the heat exchanger further includes a plurality of fins extending from the first side of the heat exchanger into the flow passage of the gas turbine engine.

In a further aspect, the present subject matter is directed to a gas turbine engine having axial centerline and defining a radial direction extending orthogonal to the axial centerline and a circumferential direction extending concentrically around the axial centerline. The gas turbine engine includes a nacelle extending in the radial direction between an interior surface in contact with the flow path and an exterior surface forming an exterior of the nacelle, with the nacelle defining a cavity. Furthermore, the gas turbine engine includes a heat exchanger positioned within the cavity, with the heat exchanger having a first side in contact with exterior air from the exterior of the nacelle and an opposing, second side, the first side of the heat exchanger in contact with bleed air.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative magnitudes of a specified attribute or parameter (e.g., speed or pressure) within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a thermal management system for a gas turbine engine. Specifically, in several embodiments, the thermal management system includes a heat exchanger having a first side and an opposing, second side. The first side of the heat exchanger is in contact with flow path air flowing through a flow path (e.g., a bypass flow passage or a compressor flow path) of the gas turbine engine. Furthermore, the thermal management system includes a housing positioned relative to the heat exchanger such that the housing and the second side of the heat exchanger define a plenum. The plenum is, in turn, configured to receive bleed air from the gas turbine engine. For example, in some embodiments, the bleed air is bled from a fan section of the engine.

During operation, the thermal management system cools one or more fluids (e.g., oil) that support the operation of the gas turbine engine. More specifically, as a fluid is pumped through one or more passages or conduits of the heat exchanger, a first portion of heat is transferred from the fluid to the flow path air. Furthermore, a second portion of heat is transferred to the bleed air supplied to the plenum. As such, the thermal management system allows heat from the fluid flowing through the heat exchanger to be dissipated from both sides thereof.

Additionally, the thermal management system includes one or more components that improve the cooling capacity of the system. For example, in some embodiments, the thermal management system includes a plurality of fins extending along the second surface of the heat exchanger in a circumferential direction. In other embodiments, the thermal management system includes an impingement plate defining a plurality of impingement apertures. Each impingement aperture is, in turn, configured to direct an impingement jet of the bleed air within the plenum onto the second side of the heat exchanger. In this respect, the circumferential fins and the impingement plate increase the heat transfer between the fluid (e.g., oil) flowing through the heat exchanger and the bleed air within the plenum. The increased heat transfer provided by the circumferential fins and the impingement plate improves the cooling capacity of the disclosed thermal management system without requiring oversized fins that adversely affect the flow passage air.

Figure 1:
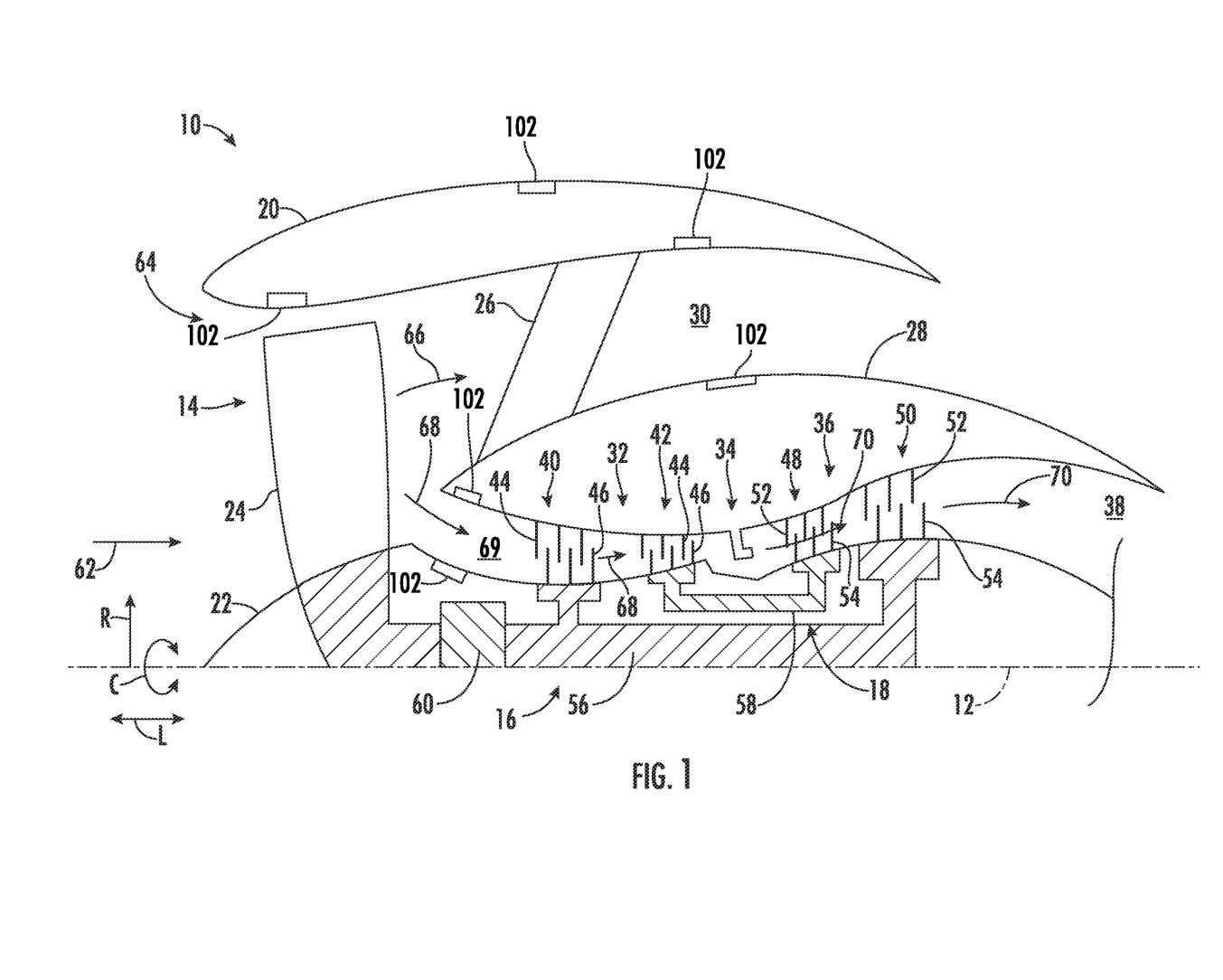
FIG. 1 is a schematic cross-sectional view of one embodiment of a gas turbine engine.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22. In this respect, the fan blades 24 are spaced apart from each other in the circumferential direction C and extend outward from the fan rotor 22 in the radial direction R. Moreover, the LP and HP spools 16, 18 are positioned downstream from the fan 14 along the axial centerline 12. As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle in the radial direction R. As such, the struts 26 support the nacelle 20 relative to the outer casing 28 such that the outer casing 28 and the nacelle 20 define a bypass airflow passage 30 positioned therebetween.

The outer body or casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 enters the compressor section 32 and flows along a compressor flow path 69 of the compressor section 32. In particular, the second portion 68 of the air 62 flows along the compressor flow path 69 through the LP compressor 40 in which the rotor blades 46 therein progressively compress the second portion 68 of the air 62. Next, the second portion 68 of the air 62 flows along the compressor flow path 69 through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. However, in alternative embodiments, the LP shaft 56 may be directly coupled to the fan 14 such that the LP turbine 50 directly drives the fan 14. The combustion gases then exit the engine 10 through the exhaust section 38.

Additionally, the gas turbine engine 10 includes one or more heat exchangers 102. In general, the heat exchanger(s) 102 heats and/or cools one or more fluids (e.g., oil, fuel, and/or the like) that support the operation of the engine 10. As such, the heat exchanger(s) 102 is positioned within the engine 10 such that one side of each heat exchanger 102 is in contact with the air flowing through a flow passage of the engine 10. As shown, FIG. 1 illustrates various suitable locations for the heat exchanger(s) 102. For example, as shown, a heat exchanger 102 is positioned relative to the nacelle 20 such that an inner radial side of the heat exchanger 102 is in contact with the first portion 66 of the air 62 flowing through the bypass passage 30. Such heat exchanger(s) 102 may be located adjacent to or upstream of the fan 14 or downstream of the fan 14. Additionally, as shown, a heat exchanger 102 is positioned relative to the nacelle 20 such that an outer radial side of the heat exchanger 102 is in contact with the exterior air scrubbing the exterior surface of the nacelle 20. Moreover, as shown, a heat exchanger 102 is positioned relative to the outer casing 28 such that an outer radial side of the heat exchanger 102 is in contact with the first portion 66 of the air 62 flowing through the bypass passage 30. Furthermore, as shown, a heat exchanger 102 is positioned relative to the outer casing 28 such that an inner radial side of the heat exchanger 102 is in contact with the second portion 68 of the air 62 flowing along the compressor flow path 69. In addition, as shown, a heat exchanger 102 is relative to the engine 10 such that an outer radial side of the heat exchanger 102 is in contact with the second portion 68 of the air 62 flowing along the compressor flow path 69. However, the above-described locations for the heat exchangers 102 are provided as examples. As such, in alternative embodiments, the heat exchanger(s) 102 may be positioned at any other suitable location(s) of the engine 10 and/or the engine 10 may include any other suitable number of heat exchangers 102.

Figure 2:
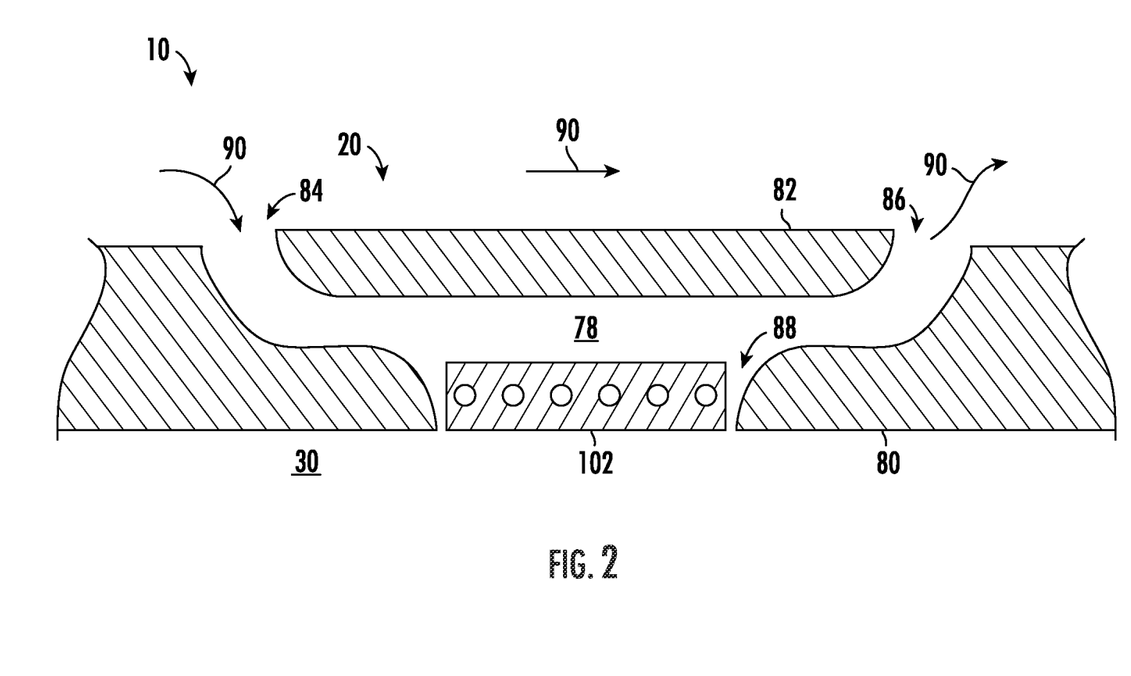
FIG. 2 is an enlarged schematic cross-sectional view of another embodiment of a gas turbine engine, illustrating a ram air scoop defined by a nacelle of the engine.

Referring to FIG. 2, in some embodiments, the nacelle 20 defines a ram air scoop 78. Specifically, the nacelle 20 extends in the radial direction R between an interior surface 80 defining the outer boundary of the bypass flow path 30 and an exterior surface 82 defining the exterior of the nacelle 20. In this respect, the ram air scoop 78 extends from an inlet 84 defined by the exterior surface 82 inward into the interior of the nacelle 20 and then outward to an outlet 86 defined by the exterior surface 82. As shown, a heat exchanger 102 is positioned within a cavity 88 defined by the nacelle 20 such that an inner radial surface of the heat exchanger 102 is in contact with the first portion 66 of air 62 flowing through the bypass passage 30 and an outer radial surface of the heat exchanger 102 is in contact with exterior air (indicated by arrow 90) scrubbing over the exterior surface 82 of the nacelle 20. As such, exterior air 90 may flow into the ram air scoop 78 via the inlet 84 and flow across the outer radial side of the heat exchanger 102 before exiting the ram air scoop 78 via the outlet 86.

The configuration of the gas turbine engine 10 described above and shown in FIGS. 1 and 2 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
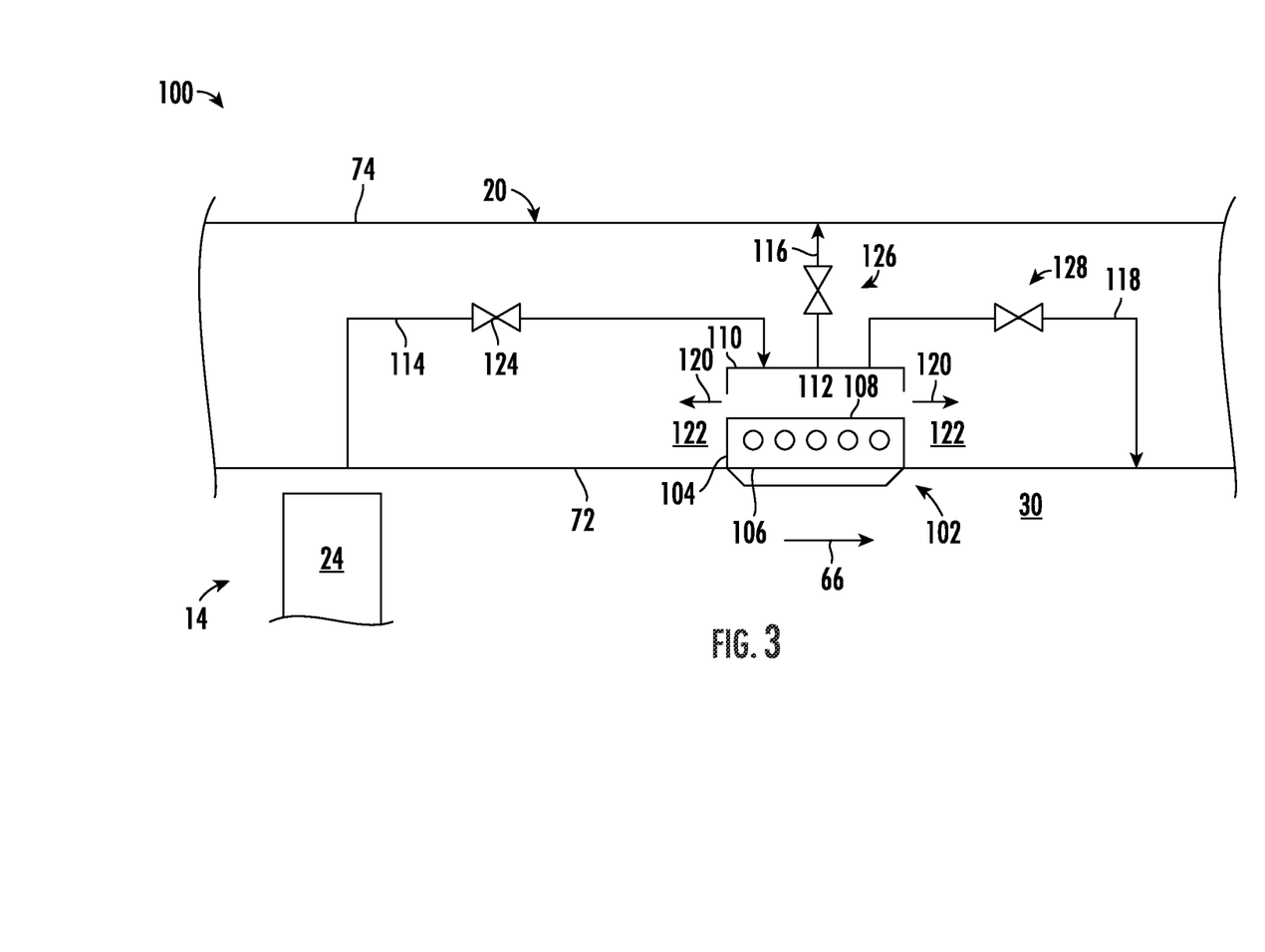
FIG. 3 is a simplified, schematic view of one embodiment of a thermal management system for a gas turbine engine.

FIG. 3 is a simplified, schematic view of one embodiment of a thermal management system 100 for a gas turbine engine. In general, the system 100 will be discussed in the context of the gas turbine engine 10 described above and shown in FIGS. 1 and 2. However, the disclosed system 100 may be implemented with any gas turbine engine having any other suitable configuration.

In several embodiments, the thermal management system 100 includes a heat exchanger 102. In general, the heat exchanger 102 is configured to cool one or more fluids supporting the operation of the gas turbine engine 10. For example, in one embodiment, a heat exchanger 102 is configured to cool oil used to lubricate one or more sumps and/or gearboxes (e.g., the gearbox 60) of the engine 10. Such a heat exchanger 102 may be known as a surface air-cooled oil cooler. As such, the heat exchanger 102 includes a heat exchanger body 104 having a first exterior side 106 and an opposing, second exterior side 108. As will be described below, the first and second exterior sides 106, 108 of the heat exchanger body 104 are both cooled. Although FIG. 3 illustrates a single heat exchanger 102, the thermal management system 100 may, in alternative embodiments, include two or more heat exchangers 102.

Moreover, the heat exchanger 102 may be positioned at any suitable location within the gas turbine engine 10 that allows the first side 106 of the heat exchanger body 104 to be in contact with flow passage air. In general, flow passage air is air flowing through a flow passage (e.g., the bypass passage 30, the compressor flow path 69, etc.) of the engine 10 that is primarily used for a purpose other than cooling. For example, such purposes include thrust (e.g., the first portion 66 of the air 62 flowing through the bypass passage 30), combustion (e.g., the second portion 68 of the air 62 flowing through the bypass passage 30), and/or the like. Specifically, as shown, in the illustrated embodiment, the heat exchanger 102 is positioned relative to an inner radial surface or fan duct 72 of the nacelle 20 such that the first side 106 of the heat exchanger body 104 is in contact with the first portion 66 of the air 62 flowing through the bypass passage 30 of the engine 10. In one embodiment, the first side 106 of the heat exchanger body 104 may be coplanar with the inner radial surface 72 of the nacelle 20. As such, heat from the fluid(s) flowing through the heat exchanger 102 is transferred to the first portion 66 of the air 62. However, as described above, in alternative embodiments, the heat exchanger 102 may be positioned at any other suitable location within the gas turbine engine 10.

Furthermore, in several embodiments, the thermal management system 100 includes a housing 110. Specifically, in such embodiments, the housing 110 is positioned relative to the heat exchanger 102 such that the housing 110 and the second side 108 of the heat exchanger 110 define a plenum 112 therebetween. For example, as shown, in the illustrated embodiment, the housing 110 may be positioned outward from the second side 108 of the heat exchanger 102 in the radial direction R and inward from an outer radial surface 74 of the nacelle 20 in the radial direction R. In this respect, the plenum 112 is configured to receive bleed air from the gas turbine engine 10 for cooling the second side 108 of the heat exchanger. Bleed air is, in turn, an air flow that is primarily or solely used for cooling. As will be described below, the thermal management system 100 includes features positioned within the plenum 112 that increase the heat transfer between the fluid flowing through the heat exchanger 102 and the bleed air within the plenum 112. However, in alternative embodiments, the housing 110 may be positioned relative to the heat exchanger 102 in any other suitable manner such that the housing 110 and the second side 108 of the heat exchanger 110 define the plenum 112 therebetween.

The bleed air may be supplied to the plenum 112 from any suitable source. For example, in the illustrated embodiment, the thermal management system 100 includes a duct 114 extending from a portion of the nacelle 20 adjacent to the fan 14. In this respect, a small amount of the first portion 66 of the air 62 is bled off the bypass passage 30 for cooling the second side 106 of the heat exchanger body 104. This bleed air then flows through the duct 114 for delivery to the plenum 114. However, in alternative embodiments, the duct 114 may be configured to supply bleed air to the plenum 112 from any other suitable source, such as air bled from another suitable location of the bypass passage 30 or from the compressor flow path 69. Additionally, in some embodiments, the plenum 114 may receive external air 90 from the ram air scoop 78 (FIG. 2) defined by the nacelle 20.

Additionally, after use in cooling the second side 108 of the heat exchanger body 104, the bleed air is exhausted from the plenum 112. For example, in one embodiment, the used bleed air is exhausted to an exterior of the gas turbine engine 10 via a duct 116. In another embodiment, the used bleed air is exhausted to flow path with which the first side 106 of the heat exchanger body 104 is in contact (e.g., the bypass passage 30) via a duct 118. Moreover, in a further embodiment, the used bleed air (e.g., indicated by arrows 120 in FIG. 3) is exhausted to a nacelle or undercowl cavity 122 of the gas turbine engine 10. However, in alternative embodiments, the used bleed air may be exhausted from the plenum 112 to any other suitable location.

Furthermore, in some embodiments, the thermal management system 100 includes one or more valves. In general, the valve(s) is configured to control the flow of bleed air to the plenum 112. More specifically, when the valve(s) is opened, bleed air flows to the plenum 112 and subsequently is exhausted as described above. Conversely, when the valve(s) is closed, the flow of bleed air flows into and out of the plenum 112 is halted. In this respect, the flow of the bleed to the plenum 112 can be controlled during operation of the engine 10. For example, when the fluid(s) being cooled by through the heat exchanger 102 need additional cooling (e.g., during high engine loads on hot ambient days), the valve(s) may be opened to allow bleed to flow through the plenum, thereby increasing the cooling capacity of the system 100. Conversely, when the flow passage air provides sufficient cooling to the fluid(s) flowing through the heat exchanger 102, the valve(s) may be closed. Such closing of the valve(s) reduces the volume of bleed air drawn from the flow passages of the engine 10, thereby improving efficiency of the engine 10. In one embodiment, the valve(s) is positioned upstream of the plenum 114. For example, as shown, a valve 124 may be positioned in series with the duct 114. However, in other embodiments, the valve(s) is positioned downstream of the plenum 114. For example, a valve 126 may be positioned in series with the duct 116 and/or a valve 128 may be positioned in series with the duct 118.

Figure 4:
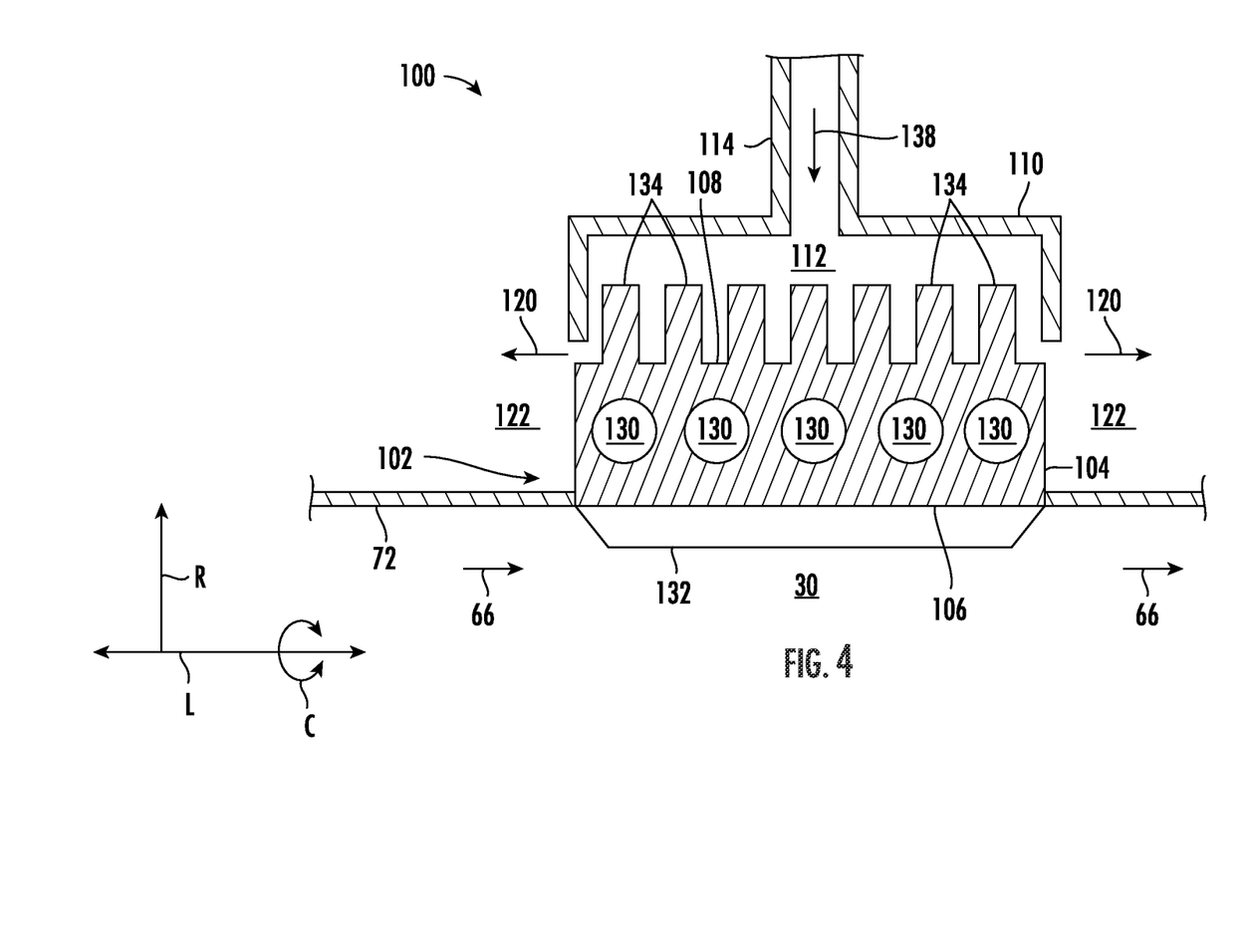
FIG. 4 is a cross-sectional view of one embodiment of a thermal management system for a gas turbine engine.
Figure 5:
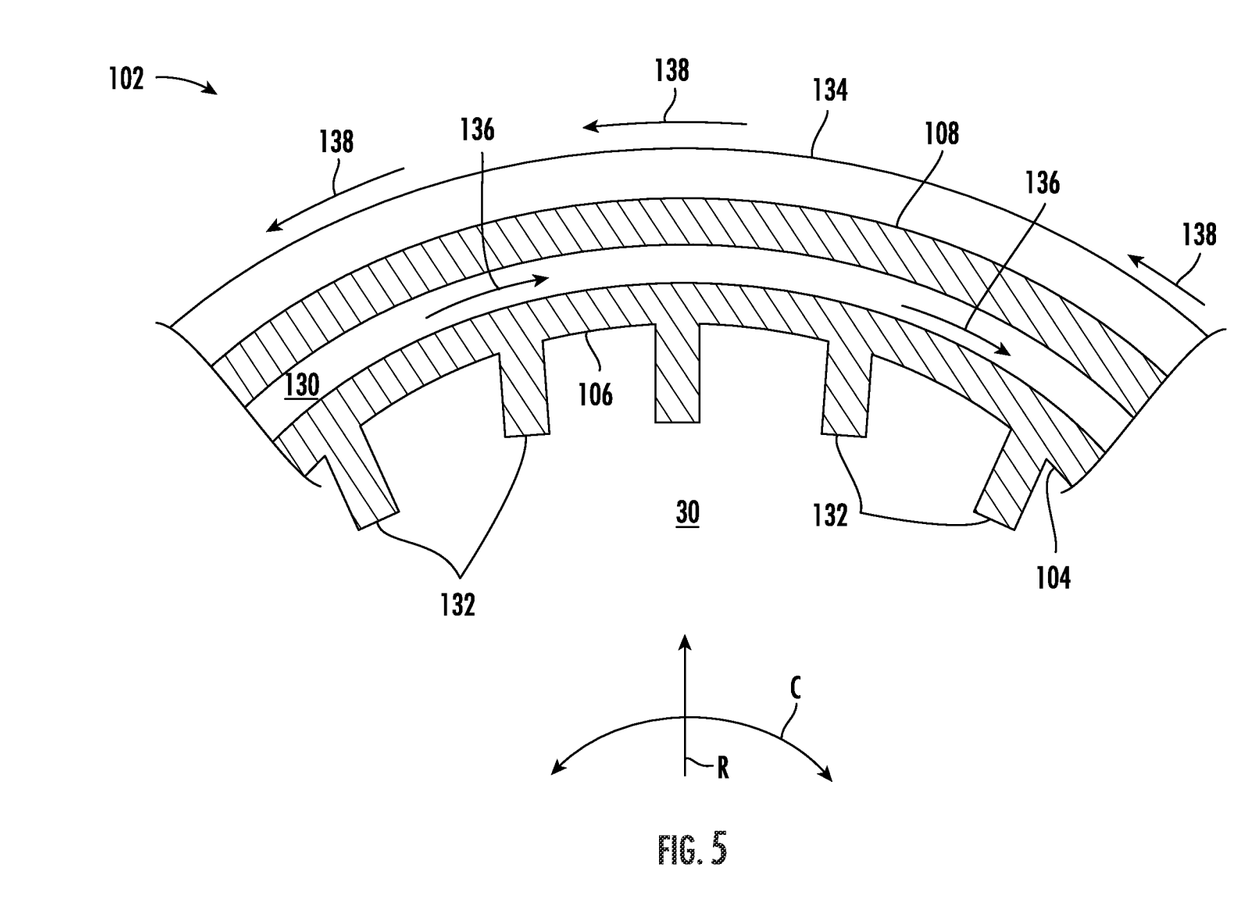
FIG. 5 is an alternate cross-sectional view of one embodiment of a heat exchanger of thermal management system shown in FIG. 4.

FIGS. 4 and 5 are enlarged views of one embodiment of a thermal management system 100 for a gas turbine engine. Specifically, FIG. 4 is an enlarged cross-sectional view of the thermal management system 100, with the cross-section generally taken along the longitudinal direction L. Furthermore, FIG. 5 is an alternate, enlarged cross-sectional view of the thermal management system 100, with the cross-section generally taken along the circumferential direction C.

As shown, the heat exchanger body 104 defines one or more fluid passages 130 therein. In general, the fluid(s) (e.g., oil) supporting the operation of the engine is cooled as the fluid(s) flow through the fluid passage(s) 130. In the illustrated embodiment, the heat exchanger body 104 defines five fluid passages 130, with each fluid passage 130 extending in the circumferential direction C. However, in alternative embodiments, the heat exchanger body 104 may define any other suitable number of fluid passages 130 and/or the fluid passage(s) 130 may extend in any other suitable direction.

In several embodiments, a plurality of fins 132 may be coupled to the first side 106 of the heat exchanger body 104. As such, the fins 132 may extend away from the first side 106 of the heat exchanger body 104 and into the flow path through which the flow path air is flowing. For example, as shown, in the illustrated embodiment, the fins 132 extend inward along the radial direction R from the first side 106 of the heat exchanger body 104 and into the bypass passage 30 through which the first portion 66 of the air 62 is flowing. In this respect, the fins 132 facilitate convective heat transfer between the fluid(s) flowing through the fluid passages(s) 130 and the first portion 66 of the air 62. Moreover, in the illustrated embodiment, the fins 132 extend along the first side 106 of the heat exchanger body 104 in the longitudinal direction L. That is, the longest dimension of the fins 132 is in the longitudinal direction L. As such, the fins 132 are generally aligned with the flow the first portion 66 of the air 62 through the bypass passage 30. However, the fins 132 may extend in any other suitable direction along the first side 106 of the heat exchanger body 104.

Additionally, in several embodiments, a plurality of fins 134 is coupled to the second side 108 of the heat exchanger body 104. More specifically, the fins 134 extend away from the second side 108 of the heat exchanger body 104 and into the plenum 112. For example, as shown, in the illustrated embodiment, the fins 134 extend outward along the radial direction R from the second side 180 of the heat exchanger body 104. Furthermore, the fins 134 extend along the second side 108 of the heat exchanger body 104 in the circumferential direction C. That is, the longest dimension of the fins 134 is in the circumferential direction C. In this respect, the fins 134 improve heat transfer between the fluid(s) flowing through the fluid passages(s) 130 and the bleed air within the plenum 112. Moreover, the fins 134 extending in the circumferential direction C provide improved cooling capacity to the system when the fins 134 are aligned with the direction of bleed air flow—the circumferential direction C in the present embodiment—in the plenum 112, thereby increasing the bleed air flow rate per unit of transverse length (i.e., in the longitudinal direction L in the present embodiment) of the heat exchanger side 108. That is, the circumferentially aligned (i.e., in the circumferential direction C) fins 134 and circumferentially flowing bleed air increases the contact time between the bleed air and the heat exchanger 102 for a given bleed air velocity.

As mentioned above, the thermal management system 100 is configured to cool one or more fluids (e.g., oil) flowing through the heat exchanger 102. More specifically, as a fluid (indicated by arrows 136) flows through the cooling passages 130 of the heat exchanger 102, heat is transferred from the fluid 136 to the heat exchanger body 104, the fins 132, and the fins 134. Heat from the fins 132 and the first side 106 of the heat exchanger body 104 is, in turn, convectively transferred to the first portion 66 of the air 62 flowing through the bypass passage 30. Moreover, a flow of bleed air (indicated by arrows 138) enters the plenum 112 via the duct 114. The bleed air 138 then flows along the fins 134 and the second side 108 of the heat exchanger body 104 in the circumferential direction C. As such, heat from the fins 134 and the second side 108 of the heat exchanger body 104 is convectively transferred to the bleed air 138. In the illustrated embodiment, the used bleed air 122 is exhausted from the plenum 112 into the undercowl cavity 122. However, as mentioned above, the used bleed air 122 may be exhausted from the plenum 112 to the exterior of the engine 10 or into the bypass passage 30.

Figure 6:
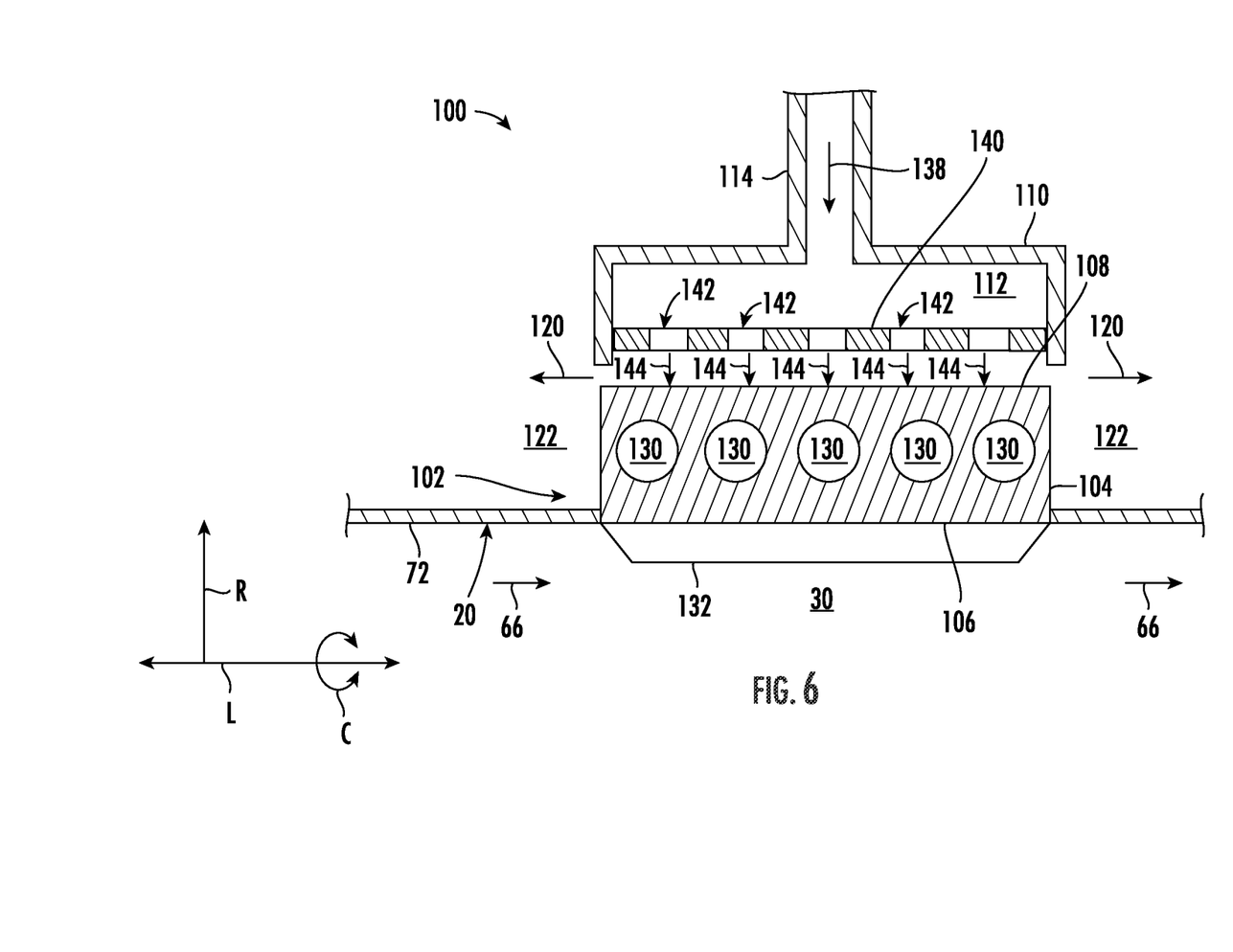
FIG. 6 is a cross-sectional view of another embodiment of a thermal management system for a gas turbine engine.

FIG. 6 is an enlarged cross-sectional view of another embodiment of a thermal management system 100 for a gas turbine engine Like the embodiment of the thermal management system 100 shown in FIGS. 4 and 5, the thermal management system 100 shown in FIG. 6 includes a heat exchanger 102 and a housing 110 defining a plenum 112 therebetween. However, unlike the embodiment of the thermal management system 100 shown in FIGS. 4 and 5, the thermal management system 100 shown in FIG. 6 does not include a plurality of fins 134 extending along a second side 108 of the heat exchanger body 104 in the circumferential direction C. Instead, the thermal management system 100 shown in FIG. 6 includes an impingement plate 140 positioned within the plenum 112. As shown, the impingement plate 140 includes a plurality of impingement apertures 142. Each impingement aperture 142 is, in turn, configured to direct an impingement jet (indicated by arrows 144) of the bleed air 138 within the plenum 112 onto the second side 108 of the heat exchanger body 104.

Like the embodiment of the thermal management system 100 shown in FIGS. 4 and 5, the thermal management system 100 of FIG. 6 is configured to cool one or more fluids (e.g., oil) flowing through the heat exchanger 102. More specifically, as the fluid 136 flows through the cooling passages 130 of the heat exchanger 102, heat is transferred from the fluid 136 to the heat exchanger body 104 and the fins 132. Heat from the fins 132 and the first side 106 of the heat exchanger body 104 is, in turn, convectively transferred to the first portion 66 of the air 62 flowing through the bypass passage 30. Moreover, a flow of bleed air 138 enters the plenum 112 via the duct 114. The bleed air 138 then flows through the impingement apertures 142. The bleed air 138 exits the impingement apertures 142 as the impingement jets 144, which are directed at the second side 108 of the heat exchanger body 104. The impingement jets 144 create a relatively high convective coefficient of heat transfer on the second side 108 of the heat exchanger body 104. Heat from the second side 108 of the heat exchanger body 104 is convectively transferred to the bleed air 138. Impingement can improve heat transfer between the bleed air 138 and the second side 108 of the heat exchanger body 104, thereby improving the cooling capacity of the system 100. In the illustrated embodiment, the used bleed air 122 is exhausted from the plenum 112 into the undercowl cavity 122. However, as mentioned above, the used bleed air 122 may be exhausted from the plenum 112 to the exterior of the engine 10 or into the bypass passage 30.

Figure 7:
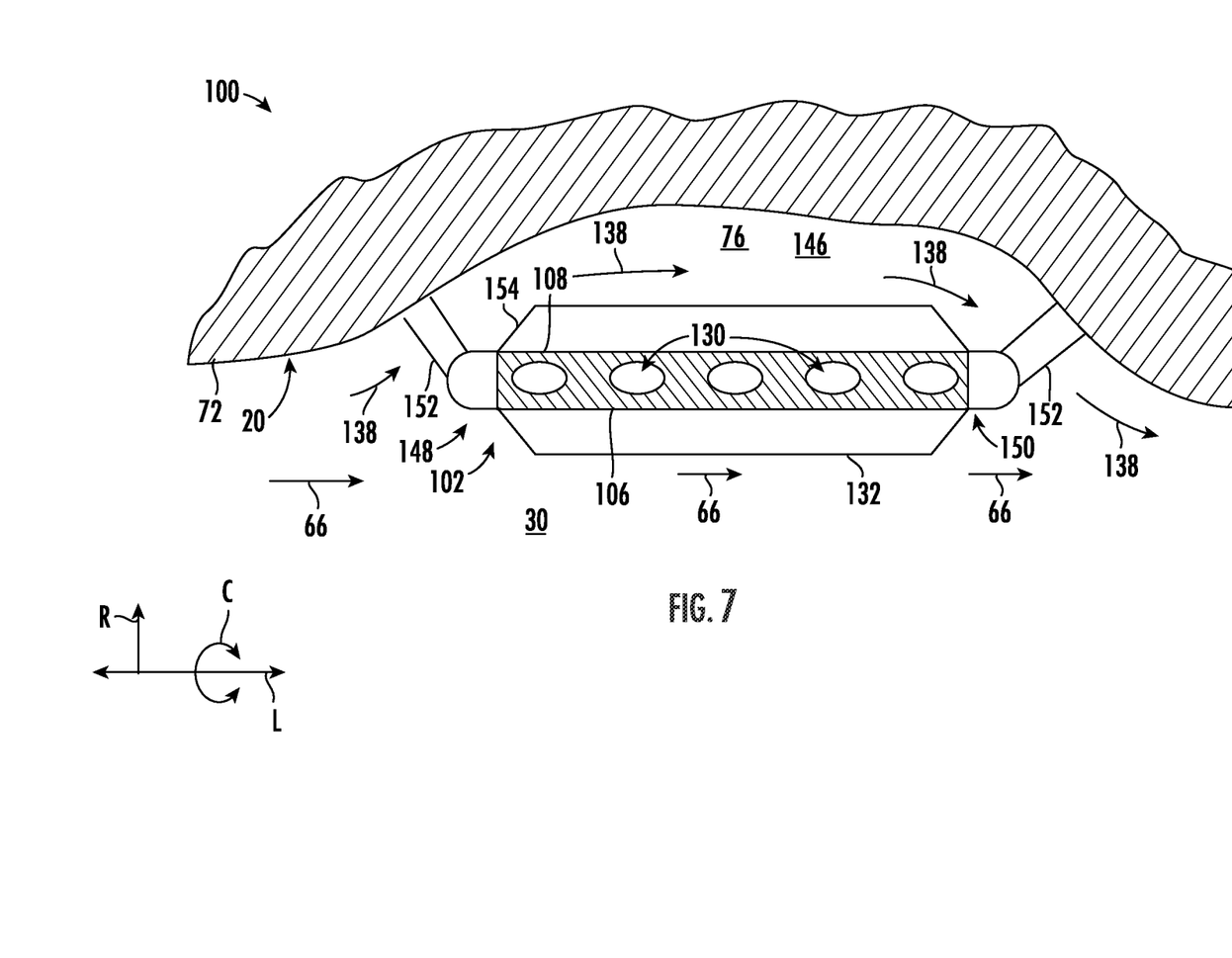
FIG. 7 is a cross-sectional view of a further embodiment of a thermal management system for a gas turbine engine.

FIG. 7 is an enlarged cross-sectional view of a further embodiment of a thermal management system 100 for a gas turbine engine. Like the embodiments of the thermal management system 100 shown in FIGS. 4-6, the thermal management system 100 shown in FIG. 7 includes a heat exchanger 102 having a first side 106 in contact with air flowing through of flow passage of the engine 10, namely the first portion 66 of the air 62 flowing through the bypass passage 30. Additionally, like the embodiments of the thermal management system 100 shown in FIGS. 4-6, the thermal management system 100 shown in FIG. 7 includes a plurality of fins 132 extending from the first side 106 of the heat exchanger body 104 into a flow passage of the gas turbine engine 10. For example, as shown in FIG. 7, in the illustrated embodiment, the plurality of fins 132 extend inward from the first side 106 of the heat exchanger body 104 in the radial direction R into the bypass passage 30.

However, unlike the embodiments of the thermal management system 100 shown in FIGS. 4-6, the heat exchanger 102 shown in FIG. 7 is mounted within a cavity defined by a wall of the gas turbine engine 10. Such wall further defines a flow path through which flow path air flows, with the cavity being inward or outward in the radial direction R of and fluidly coupled to the flow path. For example, as shown in FIG. 7, in the illustrated embodiment, the inner surface 72 of the nacelle 20 defines a cavity 76 positioned outward in the radial direction R from and fluidly coupled to the bypass passage 30. In this respect, the heat exchanger 102 is positioned within the cavity 76 such that the first side 106 of the heat exchanger body 104 is in contact with the first portion 66 of the air 62 flowing through the bypass passage 30. Moreover, the second side 104 of the heat exchanger body 104 and inner radial surface 72 of the nacelle 20 define a cooling passage 146 therebetween. Specifically, the cooling passage 146 may extend from the bypass passage 30 at a forward end 148 of the heat exchanger 102 to the bypass passage 30 at an aft end 150 of the heat exchanger 120. Additionally, the heat exchanger 102 may be mounted to the nacelle 20 via one or more hangers 152.

In several embodiments, a plurality of fins 154 may be coupled to the second side 108 of the heat exchanger body 104. As such, the fins 154 may extend away from (e.g. outward in the radial direction R) the second side 108 of the heat exchanger body 104 and into the cooling passage 146. In this respect, the fins 154 facilitate heat transfer between the fluid(s) flowing through the cooling passage 146. Moreover, in the illustrated embodiment, the fins 154 extend along the first side 106 of the heat exchanger body 104 in the longitudinal direction L. As such, the fins 154 are generally aligned with the flow through the cooling passage 146. However, the fins 154 may extend in any other suitable direction along the second side 108 of the heat exchanger body 104.

Like the embodiments of the thermal management system 100 shown in FIGS. 4-6, the thermal management system 100 of FIG. 6 is configured to cool one or more fluids (e.g., oil) flowing through the heat exchanger 102. More specifically, as a fluid flows through the cooling passages 130 of the heat exchanger 102, heat is transferred from the fluid to the heat exchanger body 104, the fins 132, and the fins 134. Heat from the fins 132 and the first side 106 of the heat exchanger body 104 is, in turn, convectively transferred to the first portion 66 of the air 62 flowing through the bypass passage 30. Moreover, a flow of bleed air 138 enters the cooling passage 146 adjacent to the forward end 148 of the heat exchanger 102. The bleed air 138 then flows through the cooling passage 146 and along the fins 154 and the second side 108 of the heat exchanger body 104. As such, heat from the fins 154 and the second side 108 of the heat exchanger body 104 is convectively transferred to the bleed air 138. The used bleed air 138 is then exhausted into the bypass passage 30 adjacent to the aft end 150 of the heat exchanger 102.

Figure 8:
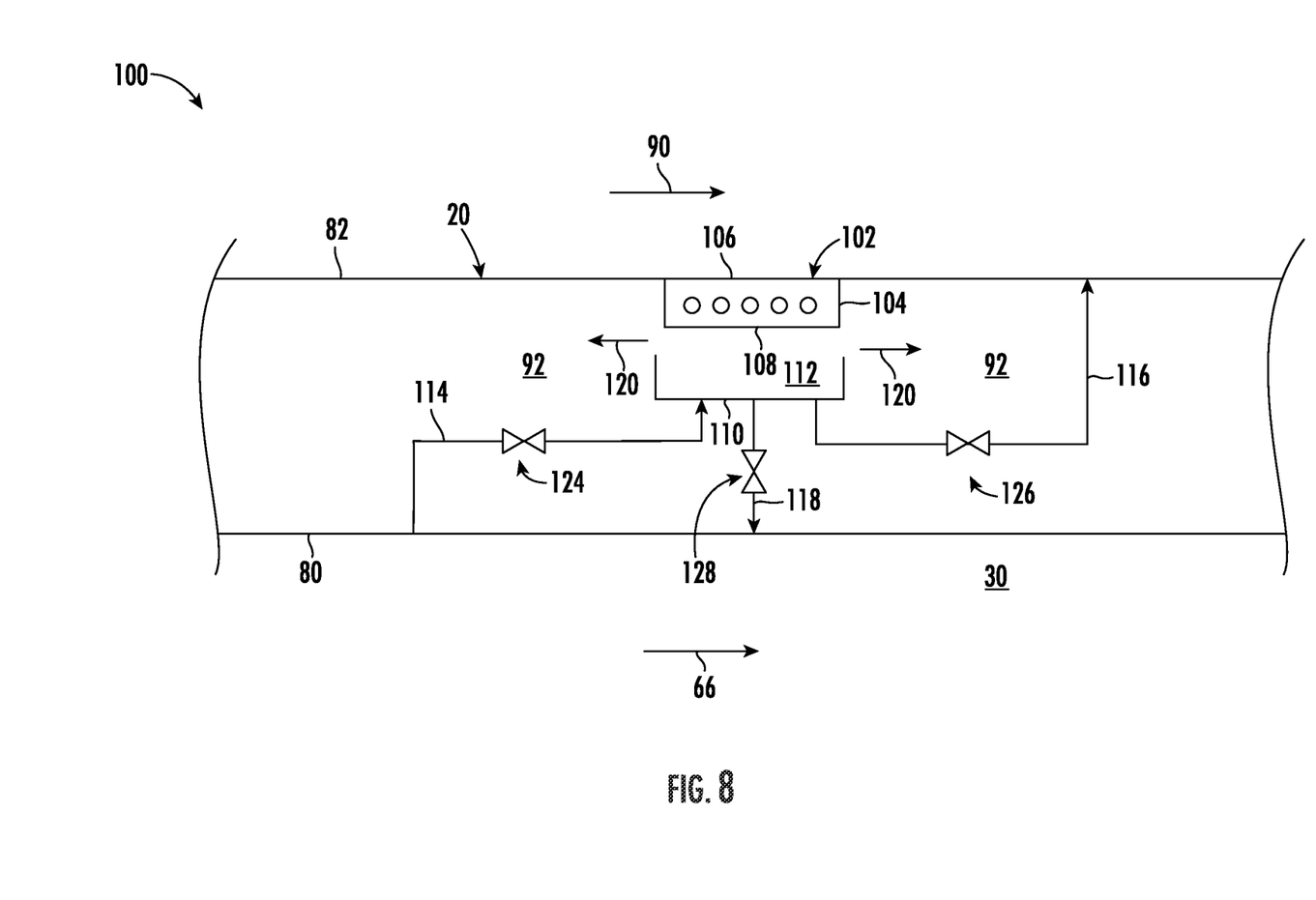
FIG. 8 is a simplified, schematic view of yet another embodiment of a thermal management system for a gas turbine engine.

FIG. 8 is a simplified, schematic view of one embodiment of yet another thermal management system 100 for a gas turbine engine. Like the embodiment of the thermal management system 100 shown in FIG. 3, the embodiment of the thermal management system 100 shown in FIG. 8 includes a heat exchanger 102 having a heat exchanger body 104 with a first exterior side 106 and an opposing, second exterior side 108. However, unlike the embodiment of the thermal management system 100 shown in FIG. 3, in the embodiment of the thermal management system 100 shown in FIG. 8, the heat exchanger 102 is positioned within a cavity 92 defined by the nacelle such that the first exterior side 106 is in contact with the exterior air 90 scrubbing over the exterior surface 82 of the nacelle 20. In one embodiment, the first side 106 of the heat exchanger body 104 may be coplanar with the exterior surface 82 of the nacelle 20. As such, heat from the fluid(s) flowing through the heat exchanger 102 is transferred to the exterior air 90. In some embodiments, the first exterior side 106 of the heat exchanger 102 exposed to the exterior air is smooth (i.e., devoid of cooling fins). However, in alternative embodiments, the first exterior side 106 may have cooling fins.

Additionally, like the embodiment of the thermal management system 100 shown in FIG. 3, the embodiment of the thermal management system 100 shown in FIG. 8 includes a housing 110. Specifically, in such embodiments, the housing 110 is positioned relative to the heat exchanger 102 such that the housing 110 and the second side 108 of the heat exchanger 110 define a plenum 112 therebetween. For example, as shown, in the illustrated embodiment, the housing 110 may be positioned inward from the second side 108 of the heat exchanger 102 in the radial direction R and outward from an interior surface 80 of the nacelle 20 in the radial direction R. In this respect, the plenum 112 is configured to receive bleed air from the gas turbine engine for cooling the second side 108 of the heat exchanger. Moreover, like the embodiment of the thermal management system 100 shown in FIG. 3, in the embodiment of the thermal management system 100 shown in FIG. 8, the bleed air may be received from the any suitable source, such as the bypass passage 30.

Furthermore, like the embodiment of the thermal management system 100 shown in FIG. 3, the embodiment of the thermal management system 100 shown in FIG. 8 may include features positioned within the plenum 112 (e.g., the fins 134 or the impingement plate 140) that increase the heat transfer between the fluid flowing through the heat exchanger 102 and the bleed air within the plenum 112.

Additionally, like the embodiment of the thermal management system 100 shown in FIG. 3, in the embodiment of the thermal management system 100 shown in FIG. 8, the bleed air is exhausted from the plenum 112. For example, in one embodiment, the used bleed air is exhausted to the exterior of the gas turbine engine via a duct 116. In another embodiment, the used bleed air is exhausted to the bypass passage 30 via a duct 118. Moreover, in a further embodiment, the used bleed air (e.g., indicated by arrows 120 in FIG. 3) is exhausted to the nacelle cavity 92 of the gas turbine engine 10. However, in alternative embodiments, the used bleed air may be exhausted from the plenum 112 to any other suitable location. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A thermal management system for a gas turbine engine having axial centerline and defining a radial direction extending orthogonal to the axial centerline and a circumferential direction extending concentrically around the axial centerline, the thermal management system comprising: a heat exchanger including a first side and an opposing, second side, the first side of the heat exchanger in contact with flow path air flowing through a flow path of the gas turbine engine; a housing positioned relative to the heat exchanger such that the housing and the second side of the heat exchanger define a plenum configured to receive bleed air from the gas turbine engine; and at least one of: a plurality of fins extending outward from the second side of the heat exchanger in the radial direction into the plenum and along the second surface of the heat exchanger in the circumferential direction; or an impingement plate defining a plurality of impingement apertures, each impingement aperture configured to direct an impingement jet of the bleed air within the plenum onto the second side of the heat exchanger.

The thermal management system of one or more of these clauses, wherein the thermal management system comprises the plurality of fins extending outward from the second side of the heat exchanger in the radial direction into the plenum and along the second surface of the heat exchanger in the circumferential direction.

The thermal management system of one or more of these clauses, wherein the thermal management system comprises the impingement plate defining the plurality of impingement apertures.

The thermal management system of one or more of these clauses, further comprising: a valve configured to control a flow of the bleed air to or from the plenum.

The thermal management system of one or more of these clauses, wherein the valve is positioned upstream of the plenum.

The thermal management system of one or more of these clauses, wherein the valve is positioned downstream of the plenum.

The thermal management system of one or more of these clauses, further comprising: a duct configured to supply the bleed air to the plenum.

The thermal management system of one or more of these clauses, wherein the bleed air from the plenum is exhausted to an exterior of the gas turbine engine.

The thermal management system of one or more of these clauses, wherein the bleed air from the plenum is exhausted to a flow passage of the gas turbine engine.

The thermal management system of one or more of these clauses, wherein the bleed air from the plenum is exhausted to an undercowl cavity of the gas turbine engine.

The thermal management system of one or more of these clauses, wherein the plurality of fins corresponds to a first plurality of fins, the thermal management system further comprising: a second plurality of fins extending inward from the first side of the heat exchanger in the radial direction into the flow passage of the gas turbine engine.

The thermal management system of one or more of these clauses, wherein the second plurality of fins extends along the first surface of the heat exchanger in an axial direction extending parallel to the axial centerline of the gas turbine engine.

A thermal management system for a gas turbine engine having axial centerline and defining a radial direction extending orthogonal to the axial centerline, the thermal management system comprising: a gas turbine engine wall at least partially defining a flow path through which flow path air flows, the gas turbine engine wall further defining a cavity fluidly coupled to the flow path and positioned inward or outward of the flow passage in the radial direction; and a heat exchanger including a first side and an opposing, second side, the heat exchanger positioned within the cavity such that the first side of the heat exchanger is in contact with the flow path air, the second side of the heat exchanger and gas turbine engine wall defining a cooling passage therebetween, the cooling passage extending from the flow path at a forward end of the heat exchanger to the flow path at an aft end of the heat exchanger, wherein the heat exchanger further includes a plurality of fins extending from the first side of the heat exchanger into the flow passage of the gas turbine engine.

A gas turbine engine having axial centerline and defining a radial direction extending orthogonal to the axial centerline and a circumferential direction extending concentrically around the axial centerline, the gas turbine engine comprising: a nacelle extending in the radial direction between an interior surface in contact with the flow path and an exterior surface forming an exterior of the nacelle, the nacelle defining a cavity; and a heat exchanger positioned within the cavity, the heat exchanger including a first side in contact with exterior air from the exterior of the nacelle and an opposing, second side, the first side of the heat exchanger in contact with bleed air.

The gas turbine engine of one or more of these clauses, the first side of the heat exchanger is smooth.

The gas turbine engine of one or more of these clauses, wherein the nacelle defines a passage configured to supply the bleed air to second side of the heat exchanger.

The gas turbine engine of one or more of these clauses, wherein the bleed air from the plenum is exhausted to the exterior of the gas turbine engine.

The gas turbine engine of one or more of these clauses, wherein the bleed air from the plenum is exhausted to a flow passage of the gas turbine engine.

The gas turbine engine of one or more of these clauses, wherein the bleed air from the plenum is exhausted to the cavity.

The gas turbine engine of one or more of these clauses, further comprising at least one of: a plurality of fins extending outward from the second side of the heat exchanger in the radial direction into the plenum and along the second surface of the heat exchanger in the circumferential direction; or an impingement plate defining a plurality of impingement apertures, each impingement aperture configured to direct an impingement jet of the bleed air within the plenum onto the second side of the heat exchanger.

What is claimed is:

1. A thermal management system for a gas turbine engine having an axial centerline and defining a radial direction extending orthogonal to the axial centerline and a circumferential direction extending concentrically around the axial centerline, the thermal management system comprising:

a nacelle defining a cavity extending inward in the radial direction from an exterior surface of the nacelle, the nacelle positioned radially outward of a fan of the gas turbine engine;

a heat exchanger including a heat exchanger body, the heat exchanger positioned within the cavity axially aft of the fan, the heat exchanger body including a first side and an opposing, second side, the first side of the heat exchanger body in contact with exterior air scrubbing over the exterior surface of the nacelle, and the heat exchanger body defining one or more fluid passages extending in the circumferential direction therein, the one or more fluid passages being positioned between the first side and the second side in the radial direction, a fluid of the gas turbine engine transfers heat to the exterior air as the fluid flows in the circumferential direction through the one or more fluid passages;

a housing positioned relative to the heat exchanger such that the housing and the second side of the heat exchanger body define a plenum configured to receive bleed air from the gas turbine engine; and an impingement plate defining a plurality of impingement apertures, each impingement aperture configured to direct an impingement jet of the bleed air within the plenum onto the second side of the heat exchanger body.

2. The thermal management system of claim 1, wherein the first side of the heat exchanger body is coplanar with the exterior surface of the nacelle.

3. The thermal management system of claim 1, wherein the impingement plate is positioned within the plenum.

4. The thermal management system of claim 3, wherein the impingement plate is aligned with a portion of the housing in the radial direction.

5. The thermal management system of claim 1, wherein the impingement plate is spaced apart from the second side of the heat exchanger body in the radial direction.

6. The thermal management system of claim 1, further comprising: a valve configured to control a flow of the bleed air to or from the plenum.

7. The thermal management system of claim 6, wherein the valve is positioned upstream of the plenum.

8. The thermal management system of claim 6, wherein the valve is positioned downstream of the plenum.

9. The thermal management system of claim 1, further comprising: a duct configured to supply the bleed air to the plenum.

10. The thermal management system of claim 1, wherein the bleed air from the plenum is exhausted to an exterior of the gas turbine engine.

11. The thermal management system of claim 1, wherein the bleed air from the plenum is exhausted to a flow passage of the gas turbine engine.

12. The thermal management system of claim 1, wherein the bleed air from the plenum is exhausted to an undercowl cavity of the gas turbine engine.

13. The thermal management system of claim 1, wherein a plurality of fins extends along the first side of the heat exchanger body.

14. The thermal management system of claim 13, wherein the plurality of fins extends in an axial direction extending parallel to the axial centerline of the gas turbine engine.

* * * * *